United States Patent [19]
Beavon

[11] 4,207,304
[45] Jun. 10, 1980

[54] PROCESS FOR SULFUR PRODUCTION
[75] Inventor: David K. Beavon, Pasadena, Calif.
[73] Assignee: The Ralph M. Parsons Company, Pasadena, Calif.
[21] Appl. No.: 810,092
[22] Filed: Jun. 27, 1977
[51] Int. Cl.$^2$ .............................................. C01B 17/04
[52] U.S. Cl. ..................................... 423/569; 423/563; 423/574 R
[58] Field of Search .............. 423/563, 569, 570, 574, 423/578

[56] References Cited

U.S. PATENT DOCUMENTS

| | | | |
|---|---|---|---|
| 912,743 | 2/1909 | Smith | 423/569 |
| 1,917,685 | 7/1933 | Bacon et al. | 423/569 |
| 3,640,682 | 2/1972 | Smith et al. | 423/563 X |
| 3,927,191 | 12/1975 | Archambault et al. | 423/570 |
| 3,928,547 | 12/1975 | Daley et al. | 423/570 X |
| 4,117,101 | 9/1978 | Fechner et al. | 423/569 |

FOREIGN PATENT DOCUMENTS

| | | | |
|---|---|---|---|
| 2365116 | 7/1974 | Fed. Rep. of Germany | 423/574 G |
| 2446612 | 4/1976 | Fed. Rep. of Germany | 423/569 |

Primary Examiner—G. O. Peters
Attorney, Agent, or Firm—Christie, Parker & Hale

[57] ABSTRACT

A liquid or solid hydrocarbon is partially oxidized in the presence of steam and oxygen in a high temperature reducing flame zone to which at least sulfur dioxide is added to consume generated hydrogen and carbon monoxide formed in a second flame zone to form hydrogen sulfide as necessary for a Claus reaction. Elemental sulfur is thermally formed. The gas stream is rapidly cooled to prevent further reactions, then further cooled to condense sulfur. The resultant gas stream is passed to one or more Claus conversion zones where hydrogen sulfide and sulfur dioxide react to form sulfur.

27 Claims, 1 Drawing Figure

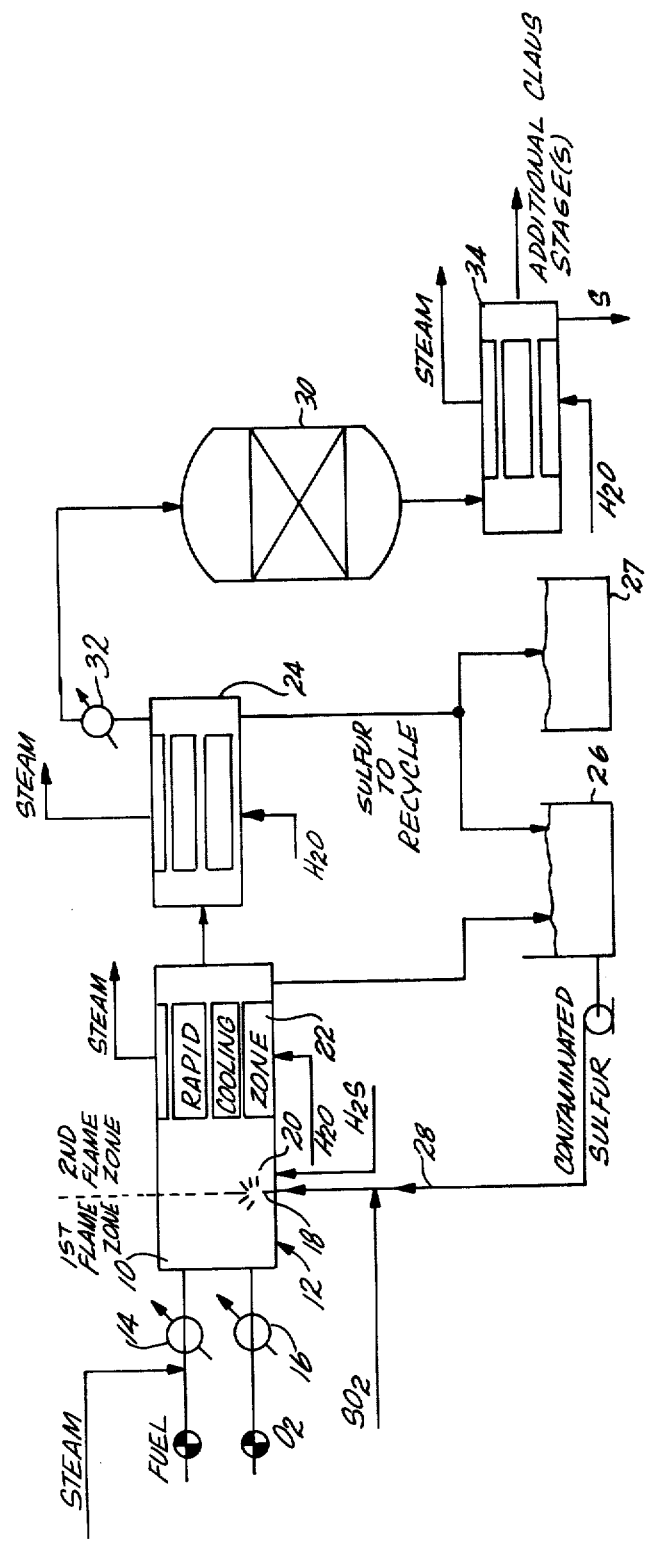

PROCESS FOR SULFUR PRODUCTION

BACKGROUND OF THE INVENTION

The production of sulfur by the well known modified Claus reaction:

$$2H_2S + SO_2 \rightarrow 3S + 2H_2O \tag{1}$$

is industrially based on a supply of hydrogen sulfide.

The advent of the need for alternate sources of energy and chemicals from solid carbonaceous materials such as coal has placed fresh emphasis on carbonaceous conversion operations. Many such operations generate sulfur dioxide as a part of desulfurization operations and at locations where a conventional sulfur dioxide reactants such as methane are not available. This presents a problem of coping with the elimination of what would otherwise be a problem of air pollution. The solution of such a problem is the subject of this invention.

SUMMARY OF THE INVENTION

There is provided a process for the production of sulfur which comprises generating in a first flame zone of a thermal reaction stage a gaseous stream comprising hydrogen and carbon monoxide by partial oxidation or gasification of a liquid and/or solid carbonaceous material in the presence of steam and oxygen to form a reducing flame containing hydrogen, carbon monoxide and steam. Sulfur dioxide is added to the thermal reaction zone in a quantity sufficient to react with hydrogen and, its equivalent, carbon monoxide present in the reducing flame to form hydrogen sulfide and provide a net gas stream containing hydrogen sulfide to sulfur dioxide in a molar ratio of about 2:1. Sulfur dioxide addition forms a second flame zone having a temperature of at least about 1200° F., preferably 1500° F., and more preferably above about 2000° F. Hydrogen sulfide to the extent it may be present at the site can be added to form part of the gas in the second flame zone enabling an increase in SO$_2$ feed in proportion to the amount of hydrogen and carbon monoxide generated in the first flame zone.

The generated hydrogen reacts with the sulfur dioxide to form hydrogen sulfide. Carbon monoxide reacts with water to yield hydrogen for reaction with sulfur dioxide to form hydrogen sulfide. Competing reactions are the formation of COS and CS$_2$ from reaction of carbon monoxide and free carbon with sulfur dioxide and sulfur. Free carbon and tars to the extent present may be washed from the system by introduction of liquid sulfur which is recycled to enable consumption of extracted carbon. The vapor stream contains formed sulfur and unreacted hydrogen sulfide and sulfur dioxide.

The vapor stream is rapidly cooled to a temperature sufficiently low to substantially prevent any further reaction of hydrogen and carbon monoxide with sulfur and terminate sulfur producing reactions. Sulfur may be condensed at this or a later point. Preferably, the vapor stream is cooled to below about 800° F. or less within a time less than 2 seconds, preferably less than 1 second, and more preferably less thn 0.5 second.

The vapor stream is further cooled to a temperature above the melting point of sulfur to condense sulfur in a quantity to yield a second vapor stream of a minimal sulfur content to enhance sulfur production by the conventional Claus process. Additional sulfur is catalytically formed in one or more catalytic Claus conversion zones normally at a temperature from about 350° to about 700° F., wherein sulfur is formed by reaction of contained hydrogen sulfide with sulfur dioxide. The catalysts used are bauxite, alumina and the like. After each catalytic stage, the sulfur formed is condensed and the gas from the condensation zone reheated to a temperature suited to introduction to a net next catalytic conversion stage.

THE DRAWING

The attached Drawing illustrates apparatus as may be used to carry out the process of this invention.

DETAILED DESCRIPTION

The present invention is directed to a process for the production of elemental sulfur.

With reference to the Drawing, the process begins in a first thermal reaction stage having two flame zones, wherein in the second H$_2$S is thermally formed by reaction of sulfur dioxide with hydrogen and its equivalent carbon monoxide thermally generated in the first thermal reaction zone, at a temperature of at least above 1200° F., preferably above about 1500° F., preferably above about 2000° F.

Reaction in the second thermal reaction zone is followed by rapid cooling typically to below about 800° F. to minimize sulfur consuming reactions.

The gas stream is cooled further to a temperature between the dew and melting points of sulfur with attendant condensation and removal of formed and any introduced sulfur to leave a gas stream containing a proper stoichiometric ratio of hydrogen sulfide to sulfur dioxide for ensuing Claus reactions to form additional sulfur.

An essential element of the invention is that in the first thermal reaction zone at the temperatures employed, hydrogen and carbon monoxide, are generted from a low cost carbonaceous material either normally liquid and/or solid in nature for reaction with sulfur dioxide in a second flame zone to provide the 2:1 hydrogen sulfide to sulfur dioxide mole ratio for thermal and catalytic sulfur production by the Claus process. The desired thermal reactions include:

$$2H_2S + SO_2 \rightarrow 3S + 2H_2O \tag{1}$$

$$SO_2 + 3H_2 \rightarrow H_2S + 2H_2O \tag{2}$$

$$CO + H_2O \rightarrow CO_2 + H_2 \tag{3}$$

Sulfur introduced or formed reacts to form hydrogen sulfide by the reaction:

$$S_x + xH_2 \rightarrow xH_2S \tag{4}$$

COS and CS$_2$ may also be formed.

Then the gas stream is cooled rapidly to preferably about 800° F. or below, its composition becomes essentially "frozen". The result is that gas stream fed to a Claus catalytic reactor contains H$_2$S and SO$_2$ in right stoichiometric ratio for additional sulfur production.

Any tail gas from the process may be treated in accordance with U.S. Pat. No. 3,752,877 issued to me.

More particularly, and with reference to the Drawing, the process starts with generating a reducing agent, i.e. H$_2$ and CO, needed to reduce sulfur dioxide to hydrogen sulfide. This occurs by partial oxidation or gasification of the carbonaceous material in the presence of water as steam and a source of oxygen such as air or oxygen enriched air in first flame zone 10 of reactor 12. Carbonaceous materials range from materials liquefiable at ambient temperature such as liquefied petroleum gas, i.e. propane and/or butane, to residual fuel oil and particulate solid carbonaceous materials and their mixtures as available at the site. It is preferred to use normally liquid, but vaporizable hydrocarbons. The balance, considering cost, availability, and convenience, favors using kerosene, furnace oil, diesel fuel and the like. Hydrogen or gaseous hydrocarbons may be added as a supplement at the expense of increased fuel cost. Flame temperature is above about 2000° F., typically from 2100° F. to about 3000° F. or more as dictated by materials of construction. To maintain high flame temperatures, preheating of the reactants in exchangers 14 and 16 is desirable. When the fuel is a normally liquid hydrocarbon, it is preferred to preheat the hydrocarbon to at least about 300° F. and/or vaporize at least half of the fuel ahead of the flame zone.

Steam is provided to aid in the combustion process. Steam has several functions. Steam assists in vaporizing and atomizing the hydrocarbon fuel and suppresses the formation of solid carbon. To the extent carbon is formed, sulfur from reservoir 26 may be introduced to the second flame zone 20 with sulfur dioxide to cleanse the gas of free carbon. As shown, contaminated liquid sulfur is recycled to rid the final sulfur product of carbon. Introduced liquid sulfur may be converted to $H_2S$, COS and $CS_2$. To the extent it is converted to $H_2S$, the feed of sulfur dioxide can be increased.

In using diesel fuel oil with an ASTM distillation boiling range of about 400° F. to 700° F., for example, the diesel fuel oil may be mixed with steam in the portion of from about 0.5 to about 3 pounds of steam per pound of fuel, preferably about 1 pound per pound.

As indicated, preheating of the fuel and steam, as well as the source of oxygen in exchangers 14 and 16, assists in maintaining a high thermal reaction temperature while reducing the quantity of fuel and air used in the process. To this end, the extent of preheat used is decided largely by economic considerations. Fuel and steam may be preheated separately or in admixture. It is most preferred to preheat a mixture of fuel and steam to the end of substantially vaporizing all the fuel.

Sulfur dioxide and any liquid sulfur, if used, is introduced by nozzle 18 to form a second flame zone 20 in which the thermal reactions identified above occur. The principal reactions are 1, 2 and 3 above. Hydrogen sulfide, $CS_2$ and COS may also be formed.

Conditions in the second flame or thermal reaction zone are critical. The amount of total sulfur as $SO_2$, S and, if available, $H_2S$ introduced are to provide a net gas stream where the molar ratio of hydrogen sulfide to sulfur dioxide is about 2:1. If, for instance, hydrogen sulfide is available at the site for disposal it will be part of the feed to the catalytic Claus reactor. The amount of sulfur dioxide in proportion to generated hydrogen and carbon monoxide can be increased as less and must be converted to hydrogen sulfide.

Sulfur introduced and thermally formed is available to wash out carbon containing materials, i.e., any solid unreacted carbon or tarry material formed in the flame.

To achieve the proper results, the net thermal reaction temperature in the second flame zone must be at least about 1200° F., preferably above 1500° F. and more preferably above 2000° F. Temperatures above 2000° F. speed the thermal reactions and reduce formation of solid carbon, but require consumption of more fuel and air.

To terminate sulfur consuming as well as sulfur forming reactions, the effluent from the second flame zone is rapidly cooled to a temperature where the thermal reactions becomes negligibly slow. A preferred temperature is about 800° F. or less. Rapid cooling may be accomplished by passing products of the thermal reactor 12 through the tubes of a fire tube steam boiler 22 with a residence time of gas in the tubes of about 2 seconds or less, preferably 1 second or less, and more preferably 0.5 second or less. If a large quantity of sulfur is introduced, some sulfur containing carbon and tars may be immediately condensed and removed for recycle enabling collection of higher purity sulfur in the next cooling zone.

The gases are then further cooled in condenser 24 to remove most of the sulfur which is separated and removed as a liquid with any collected free carbon and tars. Cooling is at least sufficient to reduce the quantity of remaining sulfur vapor to as low as possible to favor the ensuing catalytic Claus reaction. The lower limit of cooling is the melting point of sulfur at the gas composition employed, typically about 240° F.

The sulfur condensate with any carbon and tars which would foul the catalyst if allowed to remain in the vapor stream, is recycled from pit 26 by line 28 back to the thermal reaction zone 20. If sulfur is condensed in the zone 22, higher purity sulfur may be collected in sulfur pit 27. From sulfur condenser 24, the vapor stream is reheated in exchanger 32 to a temperature from about 350 to about 700° F. for feed to a conventional catalytic Claus reactor 30 where the principal reaction is (1) above. Catalysts employed include bauxite, alumina and the like. As carbon and tars are removed by sulfur ahead of the catalytic stage, catalyst contamination is avoided.

After catalytic sulfur production, the vapor stream is cooled in condenser 34 to recover sulfur formed and the gas reheated and passed to one or more additional Claus conversion stages with cooling for sulfur recovery and reheating prior to feed to a next Claus stage. As required, any tail gas of the process may be treated prior to venting in accordance with U.S. Pat. No. 3,752,877 issued to me and incorporated herein by reference.

Because the reactants necessary for reduction of $SO_2$ are supplied from the first flame zone, a gas stream of any concentration of $SO_2$ can be successfully treated in the process. To this end, highly dilute streams can be processed without reduction of temperature to the point of loss of a thermal force for the reactions involved. Since the reducing gas is generated from low cost fuels, cost of operation is minimized. More importantly there is no dependence upon fuels such as hydrogen and methane which are both costly and in many instances, not available at the site where processing of crudes and the like is to occur.

What is claimed is:

1. A process for the production of sulfur which comprises:
   (a) introducing to a first flame zone of a thermal reaction stage a source of oxygen and a carbonaceous material selected from the group consisting of carbonaceous materials which are liquefiable at at least ambient temperature, particulate solid carbonaceous materials and mixtures thereof in admixture with steam to form, by at least partial oxidation of the carbonaceous material, a reducing flame comprising hydrogen, carbon monoxide, steam and carbon containing materials;

(b) adding liquid sulfur for extraction of the carbon containing materials and sulfur dioxide to the products of the first flame zone to form a second flame zone in the thermal reaction stage having a temperature of at least about 1200° F., wherein a portion of the sulfur dioxide is converted to hydrogen sulfide to the extent of forming from the total of the sulfur species introduced a gas stream wherein the molar ratio of hydrogen sulfide to sulfur dioxide is about 2:1 with thermal formation of additional sulfur by at least reaction of hydrogen sulfide with sulfur dioxide;

(c) rapidly cooling the effluent of the second flame zone in a first cooling zone to a temperature sufficiently low to substantially prevent further reaction of sulfur species present and condense sulfur contaminated with the carbon containing materials;

(d) recycling condensed sulfur contaminated with the carbon containing materials to the second flame zone;

(e) further cooling the effluent of the first cooling zone in a second cooling zone to a temperature between the melting and dew points of sulfur to condense sulfur to yield a vapor stream predominantly containing hydrogen sulfide and sulfur dioxide in a molar ratio of about 2:1;

(f) catalytically reacting the hydrogen sulfide and sulfur dioxide in the vapor stream to form sulfur in at least one Claus catalytic conversion zone maintained at a temperature from about 350° to about 700° F.; and (g) condensing the formed sulfur.

2. A process as claimed in claim 1 in which the second flame zone is at a temperature above about 1500° F.

3. A process as claimed in claim 1 in which the second flame zone is at a temperature above about 2000° F.

4. A process as claimed in claim 1 in which the effluent of the second flame zone is rapidly cooled to a temperature below about 800° F.

5. A process as claimed in claim 1 in which the effluent of the second flame zone is cooled to a temperature sufficiently low to prevent further reaction of sulfur species within a time of less than 2 seconds.

6. A process as claimed in claim 1 in which the effluent of the second flame zone is cooled to a temperature sufficiently low to prevent further reaction of sulfur species within a time less than 1 second.

7. A process as claimed in claim 1 in which the effluent of the second flame zone is cooled to a temperature sufficiently low to prevent further reaction of sulfur species within a time of less than 0.5 second.

8. A process as claimed in claim 1 in which hydrogen sulfide is added to the second flame zone.

9. A process as claimed in claim 1 in which the carbonaceous material is a normally liquid hydrocarbon and is preheated to at least 300° F. prior to introduction to the thermal reaction zone.

10. A process as claimed in claim 9 in which the hydrocarbon is preheated at a temperature sufficient to vaporize at least 50% of the hydrocarbon.

11. A process for the production of sulfur which comprises:

(a) introducing to a first flame zone of a thermal reaction stage a source of oxygen and a carbonaceous material selected from the group consisting of carbonaceous materials which are normally liquid at ambient temperature, particulate solid carbonaceous materials and mixtures thereof in admixture with steam to form, by at least partial oxidation of the carbonaceous material, a reducing flame comprising hydrogen, carbon monoxide, steam and carbon containing materials;

(b) adding liquid sulfur for extraction of carbon containing materials and sulfur dioxide to the products of the first flame zone of the products of the first reaction zone to form a second flame zone having a temperature of at least about 1200° F., wherein a portion of the sulfur dioxide reacts to form hydrogen sulfide to provide a gas stream wherein the molar ratio of hydrogen sulfide to sulfur dioxide is about 2:1 with thermal formation of additional sulfur by at least reaction of hydrogen sulfide with sulfur dioxide in said gas;

(c) rapidly cooling the effluent of the second flame zone in a first cooling zone to a temperature sufficiently low to substantially prevent further reaction of sulfur species present and condense sulfur contaminated with carbon containing materials;

(d) recycling the condensed sulfur with extracted carbon containing materials to the second flame zone;

(e) further cooling the effluent of the first cooling zone in a second cooling zone to a temperature between the melting and dew points of sulfur to condense clean sulfur to yield a vapor stream predominantly containing hydrogen sulfide and sulfur dioxide in a molar ratio of about 2:1;

(f) catalytically reacting the hydrogen sulfide with sulfur dioxide in the vapor stream to form sulfur in at least one Claus catalytic conversion zone maintained at a temperature from about 350° to about 700° F.; and (g) cooling the effluent from each Claus catalytic conversion zone to condense formed sulfur.

12. A process as claimed in claim 11 in which the second flame zone is at a temperature above about 1500° F.

13. A process as claimed in claim 11 in which the second flame zone is at a temperature above about 2000° F.

14. A process as claimed in claim 11 in which the effluent of the second flame zone is cooled to below about 800° F. within a time of less than 1 second.

15. A process as claimed in claim 11 in which the effluent of the second flame zone is cooled to below about 800° F. within a time of less than 0.5 second.

16. A process as claimed in claim 11 in which the normally liquid hydrocarbon is preheated to at least 300° F. prior to introduction to the thermal reaction zone.

17. A process as claimed in claim 11 in which the hydrocarbon is preheated to a temperature sufficient to vaporize at least 50% of the hydrocarbon.

18. A process as claimed in claim 11 in which hydrogen sulfide is added to the second flame zone.

19. A process for the production of sulfur which comprises:

(a) introducing to a first flame zone of a thermal reaction stage a source of oxygen and a normally liquid hydrocarbon preheated to at least about 300° F. in admixture with steam to form by at least partial oxidation of the hydrocarbon a reducing flame comprising hydrogen, carbon monoxide, steam and carbon containing materials;

(b) adding liquid sulfur for extraction of carbon containing materials and sulfur dioxide to products of the first thermal reaction zone to form a second flame zone having a temperature of at least about 1200° F., wherein a portion of the sulfur dioxide reacts to form hydrogen sulfide to provide a gas stream wherein the molar ratio of hydrogen sulfide to sulfur dioxide is about 2:1 with thermal formation of additional sulfur by at least reaction of hydrogen sulfide with sulfur dioxide in said gas;

(c) cooling, within a time of 2 seconds, the effluent of the second flame zone to a temperature below about 800° F. to substantially prevent further reaction of sulfur species and condense sulfur contaminated with carbon containing materials;

(d) recycling the condensed sulfur with extracted carbon containing materials to the second flame zone;

(e) further cooling the effluent of the first cooling zone in a second cooling zone to a temperature between the melting and dew points of sulfur to condense clean sulfur to yield a vapor steam predominantly containing hydrogen sulfide and sulfur dioxide in a molar ratio of about 2:1;

(f) heating the vapor stream to a temperature above about 350° to 750° F.;

(g) catalytically reacting the vapor stream in at least one catalytic Claus conversion zone maintained at a temperature from about 350 to about 750° F., the contained hydrogen sulfide with sulfur dioxide to form sulfur; and (h) cooling the effluent from each catalytic conversion zone to the dew point of sulfur to condense sulfur.

20. A process as claimed in claim 19 in which the normally liquid hydrocarbon is preheated to a temperature sufficient to vaporize at least 50% of the hydrocarbon.

21. A process as claimed in claim 19 in which the normally liquid hydrocarbon is selected from the group consisting of kerosene, furnace oil and diesel oil.

22. A process as claimed in claim 19 in which the normally liquid hydrocarbon is diesel fuel oil and is admixed with steam in proportion of about 0.5 to about 3 pounds of steam per pound of diesel oil.

23. A process as claimed in claim 19 in which the second flame zone is at a temperature above about 1500° F.

24. A process as claimed in claim 19 in which the second flame zone is at a temperature above about 2000° F.

25. A process as claimed in claim 19 in which the effluent of the second flame zone is cooled to below about 800° F. within a time of less than 1 second.

26. A process as claimed in claim 19 in which the carbonaceous material is a normally liquid hydrocarbon and is preheated to at least 300° F. prior to introduction to the thermal reaction zone.

27. A process as claimed in claim 19 in which hydrogen sulfide is added to the second flame zone.

* * * * *